United States Patent [19]

Isen

[11] 4,126,138
[45] Nov. 21, 1978

[54] SOFT CONTACT LENS

[75] Inventor: Allan A. Isen, Westport, Conn.

[73] Assignee: Warner-Lambert Company, Morris Plains, N.J.

[21] Appl. No.: 796,941

[22] Filed: May 16, 1977

Related U.S. Application Data

[63] Continuation of Ser. No. 479,233, Jun. 14, 1974, abandoned.

[51] Int. Cl.² .............................................. G02C 7/04
[52] U.S. Cl. .................................................. 351/160 R
[58] Field of Search ................................. 351/160–162

[56] References Cited

U.S. PATENT DOCUMENTS

| 2,241,415 | 5/1941 | Moulton | 351/160 |
| 2,544,246 | 3/1951 | Butterfield | 351/160 |
| 3,488,111 | 1/1970 | Isen | 351/160 |
| 3,660,545 | 5/1972 | Wichterle | 351/160 |
| 3,698,802 | 10/1972 | Baron | 351/160 |
| 3,700,761 | 10/1972 | O'Driscoll et al. | 351/160 |
| 3,807,398 | 4/1974 | Grucza | 351/160 |
| 3,933,411 | 1/1976 | Winner | 351/160 |

FOREIGN PATENT DOCUMENTS 1,045,065 10/1966 United Kingdom ...................... 351/160

OTHER PUBLICATIONS

Isen, *Naturalens Fitting Manual*, 1971.
Grosvenor, article in *American Journal of Optometry & Archives*, vol. 49, No. 5, May 1952, pp. 407–412.

*Primary Examiner*—Conrad J. Clark
*Attorney, Agent, or Firm*—Albert H. Graddis; Jeremiah J. Duggan; Stephen A. Schneeberger

[57] ABSTRACT

The specific disclosure provides a soft contact lens comprising an eye contacting inner surface, and an annular carrier portion including an outer surface spaced from the eye contacting inner surface not greater than a predetermined distance. An optical portion is encompassed by the carrier portion and includes an outer surface with all points thereon spaced from the inner surface a distance greater than the predetermined distance. An intermediate portion interconnects the carrier and optical portions and includes an outer surface extending downwardly and outwardly from the outer surface of the optical portion to the outer surface of the carrier portion.

11 Claims, 2 Drawing Figures

SOFT CONTACT LENS

This is a continuation of application Ser. No. 479,233 filed June 14, 1974, now abandoned.

BACKGROUND OF THE INVENTION

The present invention relates to a soft contact lens. More particularly, the present invention relates to a novel geometry for a soft contact lens.

A problem is designing soft contact lens is to avoid or at least minimize the tendency of the front surface of the optical portion of the lens to copy or reproduce irregularities or astigmatic shape of a cornea.

SUMMARY OF THE INVENTION

An object of the present invention is to provide a soft contact lens structure which minimizes the copying effect when a soft contact lens is placed on a cornea and tends to shape itself to the cornea.

It has been discovered by the applicant that this shaping or copying effect is a function of soft contact lens thickness. As lens thickness increases, there is a decrease in the tendency of the lens to reproduce irregularities or astigmatic shape of a cornea on the front surface of the lens.

The lens of the present invention concentrates lens mass in the optical portion by maximizing the thickness of the optical portion and minimizing the thickness of the carrier portion, and thereby avoids or at least minimizes the reproduction of cornea irregularities or astigmatic shape on the front surface of the optical portion of the lens.

Further, the thin carrier portion of the present invention improves user comfort by minimizing pressure on the peripheral portion of the cornea, the limbus and the sclera to maintain ocular tolerance. The thin carrier also avoids excessive pressure at the edge of the carrier which may inhibit flow of tears under the edge.

In accordance with the present invention there is provided a soft contact lens comprising an eye contacting inner surface, and an annular carrier portion including an outer surface spaced from the eye contacting inner surface not greater than a predetermined distance. An optical portion is encompassed by the carrier portion and includes an outer surface with all points thereon spaced from the inner surface a distance greater than the predetermined distance. An intermediate portion interconnects the carrier and optical portions and includes an outer surface extending downwardly and outwardly from the outer surface of the optical portion to the outer surface of the carrier portion.

DESCRIPTION OF SPECIFIC EMBODIMENTS

Figure 1:
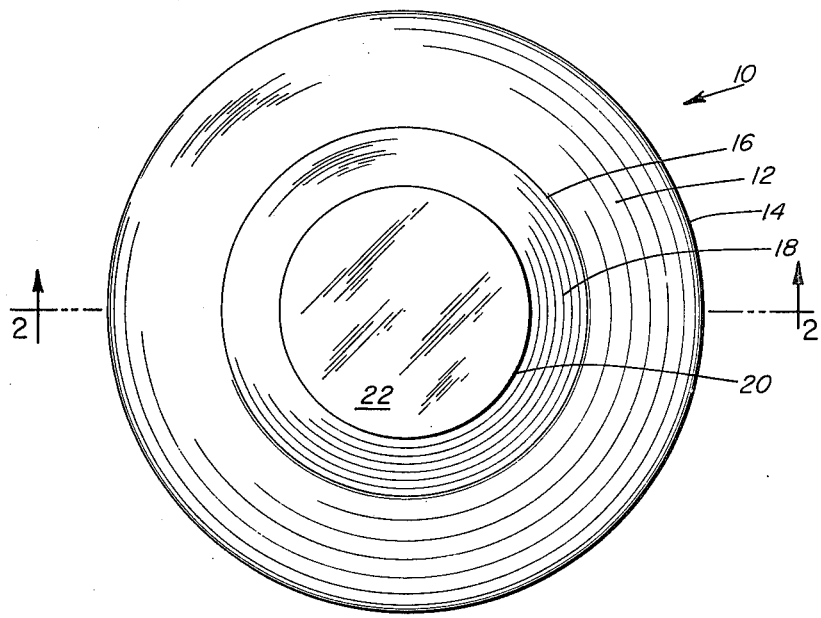
FIG. 1 is a top plan view of an embodiment of a soft contact lens constructed in accordance with the present invention.

With reference to the Figures, a soft contact lens 10 has an annular peripheral carrier portion 12, an optical central portion 22, encompassed by the carrier portion 12, and a downwardly and outwardly extending portion 18 interconnecting the carrier portion 12 and the optical portion 22. The lens 10 also has a concave inner eye contacting surface 11.

The refracting power of a lens is determined by the radii of curvature of the outer surface of the optical portion and the portion of the eye contacting inner surface which falls within the optical portion. When the radius of curvature of the outer surface of the optical portion is less than the eye contacting inner surface, the lens provides plus refracting power. Plano power is provided when the two radii are equal. In the embodiment shown in the figures, the radius of curvature of the outer surface of the optical portion 22 is greater than the radius of curvature of the inner surface 11 within the optical portion 22 to thus provide minus refracting power.

The lens of the present invention is suitable for soft contact lens requiring refracting powers in a range of low plus value of about +4.00 D. to high minus refracting powers of about −18.00 D., including plano power. Empirical experimentation may demonstrate that the invention is also suitable for refracting powers outside of this range.

The lens 10 of the present invention is particularly useful for avoiding or minimizing the copying effect on the outer surface of the optical section 22 from kerataconus and highly irregular corneas.

The invention is also useful for patients having higher degrees of astigmatism, such as 3.50 to 4.00 D., or lower degrees of astigmatism where the quality of vision is reduced; for example, 1.50 D. with 20/30 vision. Further, the invention is useful for a patient with post operative grafts.

The lens of the present invention can be composed of a composition comprising Hydroxyethyl Methacrylate, Poly-N-Vinyl Pyrrolidone, Elthylene Glycol Dimethacrylate and Methacrylic Acid as described in Grucza U.S. Pat. No. 3,807,398, issued Apr. 30, 1974. U.S. Pat. No. 3,807,398 also discloses suitable methods for manufacturing the lens of the present invention. U.S. Pat. No. 3,807,398 is incorporated herein by reference. However, the present invention also contemplates soft contact lens composed of other compositions of matter.

Figure 2:
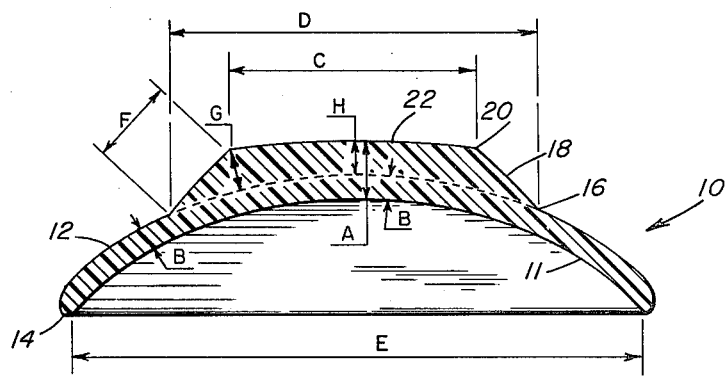
FIG. 2 is a cross-sectional view of the lens taken above line 2—2 of FIG. 1.

With reference to FIG. 2, the diameter E of the opened end 14 of the lens is between about 13.0 and about 15.5 mm. The diameter D at the base 16 of the interconnecting portion is suitably between about 9.0 and about 10.5 mm. The optical portion 22 suitably has a diameter C to its outer portion 20 between about 6.0 and about 7.5 mm.

The thickness or the height B of the peripheral carrier portion 12 above the inner surface 11 is between about 0.20 and about 0.35 mm. The thickness is also represented by a dashed line through the interconnecting portion 18.

The thickness or height A of the outer surface of the optical portion 22 above the inner surface 11 gradually increases from the center to the outer portion 20 of the optical portion 22. Thus, the height G of the outer portion 20, which is perpendicularly measured above the dashed line indicating the thickness B, is greater than the height H at the center portion of the optical portion 22. Consequently, the minus refracting embodiment provides a soft contact lens with thickened center, but with a symmetrical increase in thickness from the center to the outer circle of the optical portion 22.

In a plano power embodiment the optical portion will have a constant thickness because the radii of curvature of the outer surface of the optical portion 22 and the inner surface 11 are equal. In a plus refracting embodiment, H will be greater than G to provide a symmetrical decrease in thickness from the center to the outer circle of the optical portion.

In each case of minus, plus and plano refracting power, the height A of the optical portion is not less than a distance in the range of about 0.60 to about 0.80 mm. In each case, the radii of curvature of the inner surface 11 for an average eye is suitably about 8.40 mm.

In the minus refracting case, the height A at the center of the optical portion 22 can be between about 0.60 to about 0.80 mm. As noted above, the height or thickness G is greater than H. G + B may be about 1.10 to about 1.20 mm. for high minus refracting. The difference between G and H is determined by the amount minus refracting power required.

Conversely, the height A (G + B) at the outer circle of the optical portion 22 is between about 0.60 and about 0.80 mm. in a plus refracting power case, and H is greater than G. H + B may be about 1.10 to about 1.20 mm. for high plus refracting powers. The difference between H and G is determined by the amount of plus refracting power required.

Obviously, the slope F of the interconnecting portion 18 is defined by the values of C, D and G. "Sloping" as used herein and in the claims to describe the section 18 means either a flat or slightly outwardly or inwardly curved surface.

Specific embodiments which appear to be suitable for a broad range of users has B = 0.30 mm., C = 6.50 mm., D = 10.00 mm., and E = 14.00 mm.; with G + B = 0.70 mm. and G + B less than H + B for plus refracting, G + B = H + B = 0.70 mm. for plano power, and H + B = 0.70 mm. and H + B less than G + B for minus refracting power.

The specific embodiment of the figures provides that the radius of curvature of the outer or upper surface of the annular peripheral section 12 be equal to or at least approximately equal to the radius of curvature of the inner surface 11.

As used herein, and in the appended claims, "relatively constant" height or thickness B contemplates changes due to manufacturing tolerances in the thickness. For example, an annular peripheral section of a satisfactory contact lens embodiment of the present invention has a thickness of 0.25 to 0.30 mm., depending upon the location of the measurement. Further, the height or thickness B of the annular peripheral carrier 12 whenever described herein or in the appended claims obviously does not include the opened end 14 which may be curved as shown in FIG. 2, or beveled along the inner edge thereof.

The present invention also contemplates a carrier having an outer rim with a radius of curvature greater than the radius of curvature of the main portion of the carrier. Such a rim is shown in FIGS. 5 to 8 of U.S. Pat. No. 3,807,398.

The invention further contemplates that the carrier have a thickness not greater than about 0.35 mm. adjacent to the interconnecting section 18 and that the thickness of the carrier narrows as in the direction of the open end 14.

What is claimed is:

1. An integral soft contact leans comprising:
   (a) a continuous concave eye contacting inner surface,
   (b) an annular carrier portion having an outer diameter of about 13 to about 15.5 mm., an inner diameter of about 9.0 to about 10.5 mm. and a convex outer surface spaced from said inner surface a distance of about 0.20 to about 0.35 mm.,
   (c) an optical portion encompassed by said carrier portion, said optical portion including a convex outer surface having a radius of curvature equal to or greater than the inner surface radius of curvature and with all points thereon spaced from said inner surface not less than a distance in a range of about 0.60 to about 0.80 mm., and a diameter of about 6.0 to about 7.5 mm., and
   (d) an intermediate portion interconnecting said carrier portion and said optical portion, said intermediate portion including an outer surface extending downwardly and outwardly from the outer surface of said optical portion to the outer surface of said carrier portion.

2. The lens of claim 1 wherein said carrier portion has an outer diameter of about 14.0 mm.

3. The lens of claim 2 wherein said carrier portion has an inner diameter of about 10.0 mm.

4. The lens of claim 1 wherein said optical portion has a diameter of about 6.5 mm.

5. The lens of claim 1 wherein said inner to outer surface spacing is of said carrier portion is relatively constant 6. The lens of claim 5 wherein said inner to outer surface spacing of said carrier portion is about 0.30 mm.

7. The lens of claim 1 wherein the outer surface of said optical portion is spaced from said inner surface at least 0.70 mm.

8. The lens of claim 1 wherein the portion of said inner surface defined by said optical portion has a predetermined radius of curvature, and the outer surface of said optical portion has a radius of curvature greater than said predetermined radius of curvature, and wherein the outer surface of said optical portion is centrally spaced from said inner surface about 0.60 to about 0.80 mm. and is peripherally spaced from said inner surface a distance to provide a minus refracting power not greater than −18.00 diopters.

9. The lens of claim 1 wherein the portion of said inner surface defined by said optical portion has a predetermined radius of curvature, and the outer surface of said optical portion has a radius of curvature equal to said predetermined radius of curvature, and wherein the outer surface of said optical portion is spaced from said inner surface about 0.60 to about 0.80 mm.

10. The lens of claim 1 wherein the portion of said inner surface defined by said optical portion has a predetermined radius of curvature, and the outer surface of said optical portion has a radius of curvature less than said predetermined radius of curvature, and wherein the outer surface of said optical portion is peripherally spaced from said inner surface about 0.60 to about 0.80 mm. and is centrally spaced from said inner surface a distance to provide a plus refracting power of not greater than +2.00 diopters.

11. The lens of claim 1 wherein said lens is composed of a composition comprising Hydroxyethyl Methacrylate, Poly-N-Vinyl Pyrrolidone, Elthylene Glycol Dimethacrylate and Methacrylic Acid.

* * * * *